United States Patent [19]

Mulligan

[11] Patent Number: 4,542,911
[45] Date of Patent: Sep. 24, 1985

[54] FOLDING CAP FOR PICK-UP TRUCK

[76] Inventor: Robert J. Mulligan, 26 Oakford Glen, Clarks Summit, Pa. 18411

[21] Appl. No.: 488,209

[22] Filed: Apr. 25, 1983

[51] Int. Cl.$^4$ .......................... B62D 53/00; B60J 7/10
[52] U.S. Cl. .................................. 280/423 R; 296/27; 296/100; 296/156; 296/173
[58] Field of Search ................... 296/26, 27, 156, 165, 296/173, 29, 100, 172, 176, 120 R, 157; 280/423

[56] References Cited

U.S. PATENT DOCUMENTS

| 2,690,351 | 9/1954 | Giles | 296/102 |
|---|---|---|---|
| 3,508,787 | 4/1970 | Strong | 296/100 |
| 3,512,828 | 5/1970 | Craft | 296/100 |
| 3,536,352 | 10/1970 | Beckley | 296/23 |
| 3,578,378 | 5/1971 | Anderson | 296/137 |
| 3,690,719 | 9/1972 | Yount | 296/23 |
| 3,734,525 | 5/1973 | Rimbey | 280/30 |
| 3,823,974 | 7/1974 | Patnode | 296/23 |
| 3,843,158 | 10/1974 | Schwellenbach | 280/403 |
| 3,936,077 | 2/1976 | Bliek | 280/423 |
| 3,995,890 | 12/1976 | Fletcher | 296/10 |
| 4,221,423 | 9/1980 | Stone | 296/100 |
| 4,284,303 | 8/1981 | Hather | 296/100 |

FOREIGN PATENT DOCUMENTS 1108432 4/1968 United Kingdom .

Primary Examiner—Joseph F. Peters, Jr.
Assistant Examiner—Charles R. Watts
Attorney, Agent, or Firm—Paul & Paul

[57] ABSTRACT

A foldable cap attachment for a pick-up truck equipped with a fifth wheel hitch is disclosed which may be employed to convert the truck box into a rigid, weather-resistant camper body, the attachment being rugged in construction, easy to set up for use, and being readily foldable to a substantially flat rigid, weather-resistant cover for the truck box, said cover allowing attachment of a trailer to the fifth wheel hitch of the pick-up truck.

7 Claims, 9 Drawing Figures

FOLDING CAP FOR PICK-UP TRUCK

BACKGROUND OF THE INVENTION

This relates to camper body attachments for vehicles, and more particularly to a foldable canopy or cap attachment for use with a pick-up truck equipped to pull a fifth wheel trailer.

The fifth wheel pick-up trucks ordinarily have a fifth wheel positioned on the body while the trailer has a king pin extending downwardly from the forward end thereof which is connected to the fifth wheel. The fifth wheel means has been found to have several advantages over the rear bumper trailer hitch. One advantage is the greater stability of the fifth wheel connection. Since the downward pressure from the trailer is positioned in the truck body as opposed to the rear bumper, the truck and trailer bounce around less. In addition, with a fifth wheel attachment, the pressure of the front wheels of the truck against the ground is not decreased by the trailer weight in the back and therefore, there is greater control of the truck. Furthermore, the fifth wheel means can hold the trailer more strongly and securely than the rear bumper trailer hitch.

Cap attachments which convert pick-up trucks to campers are employed for several purposes. These caps provide an enclosed, enlarged truck box section, or camper body, within which various items may be stored and hauled. The cap is provided with a key operated lock so that the cap protects the stored items from theft, as well as from the weather. The cap also prevents the items from being blown around by the wind while the truck is being driven.

It is desirable that the attachment be portable so that when the trailer is removed from the truck at a desired time, the cap is available to readily convert the pick-up truck to a camper body. For pick-up trucks equipped with a fifth wheel for trailer attachment, such portability requires that the fifth wheel be accessible to the king pin of the trailer through the cap. This allows one, for example, to pull into a trailer park, and remove and leave the trailer at the park for days or weeks at a time, while driving and hauling various items with a rigid weather-resistant compact camper truck. At any desired time, the trailer can be readily reattached to the truck.

Until now, such an attachment for use with pick-up trucks equipped with a fifth wheel for trailer attachment and which is sturdy and rigid, yet portable has not existed.

A principle object of this invention is to provide a novel and improved foldable canopy attachment for a fifth wheel pick-up truck which may be employed to convert the truck box into a rigid, weather resistant camper body, the attachment being rugged in construction, easy to set up for use, and being readily foldable to a substantially flat rigid, weather resistant cover for the truck box, said cover allowing attachment of a trailer to the fifth wheel of the pick-up truck.

A further object of this invention is to provide a rigid weatherproof cover attachment on the box of a fifth wheel pick-up truck while pulling a trailer attached to the fifth wheel of the truck, said cover attachment being readily unfoldable to form a rigid weatherproof camper body while not pulling a trailer.

DETAILED DESCRIPTION OF PREFERRED EMBODIMENTS

Figure 1:
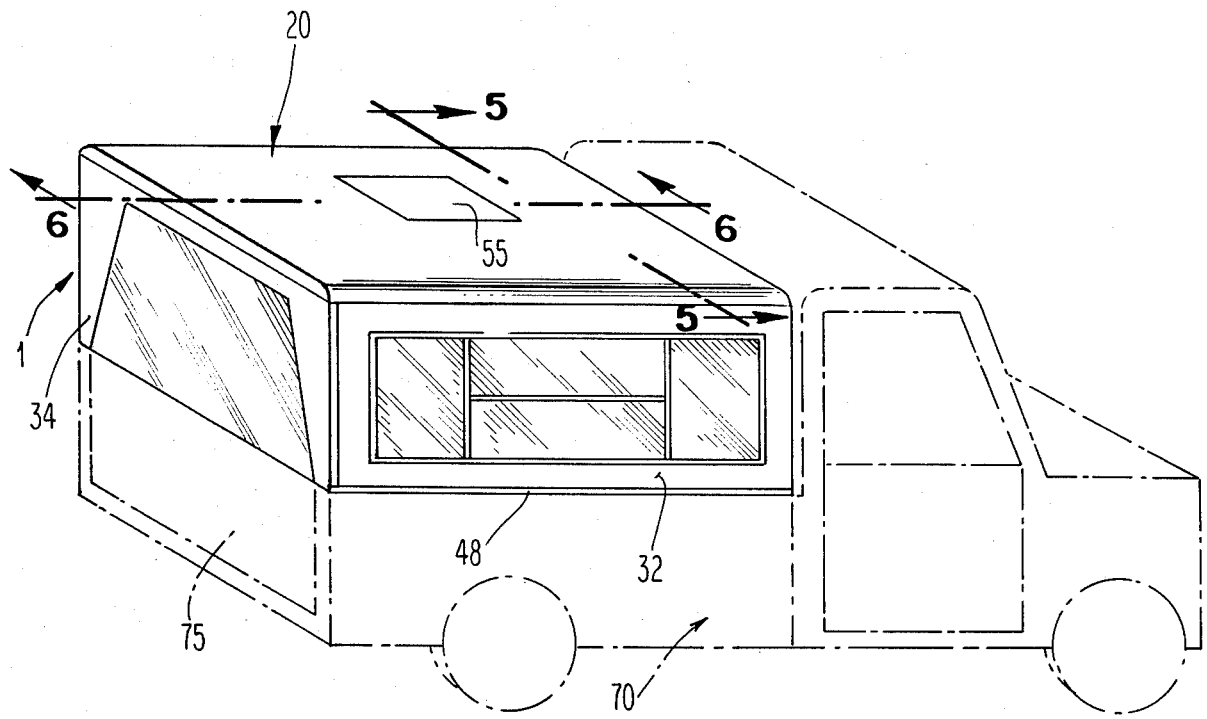
FIG. 1 is a perspective view of an expanded cap mounted on a pick-up truck, the latter being shown in phantom lines.

Referring to the drawings, 1 generally designates an improved cap attachment constructed in accordance with the present invention for the box of a pick-up truck. The box of the pick-up truck is defined by upstanding walls. Cap attachment 1 is positioned on the box.

Figure 3:
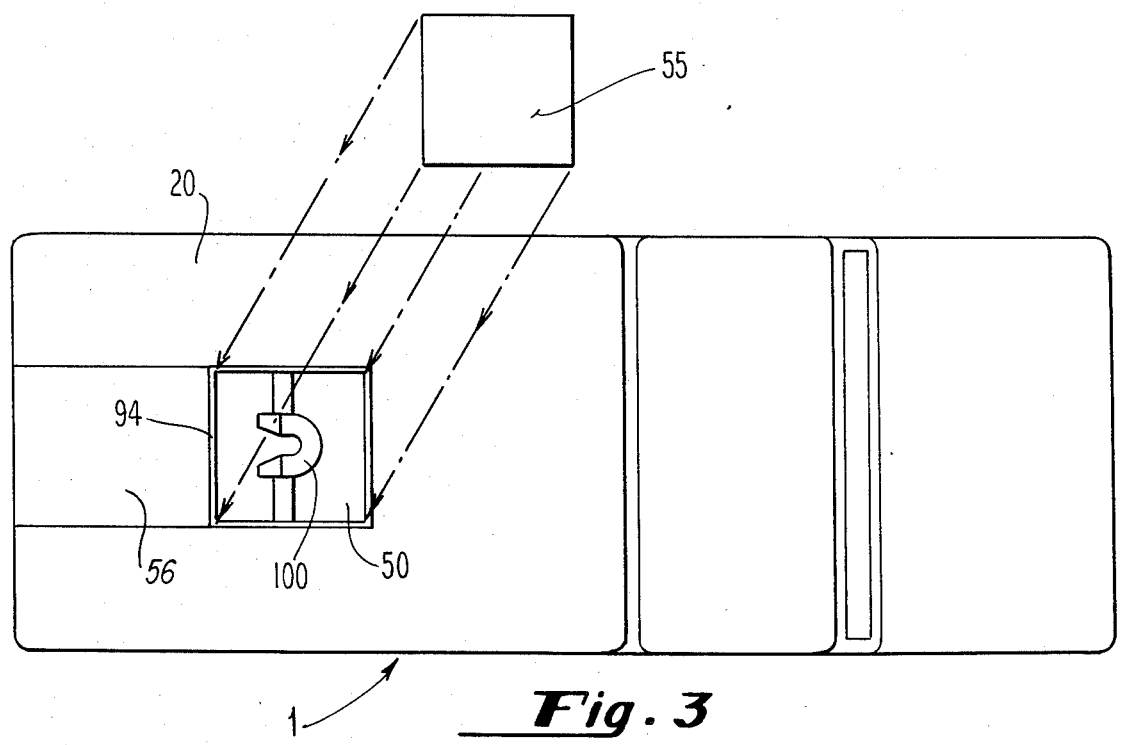
FIG. 3 is an exploded top view of a cap mounted on a pick-up truck.

Cap attachment 1 includes a rectangular top wall member 20. Top wall member 20 is provided with an opening 50 as illustrated in FIG. 3. Although the opening is shown to be square, it should be understood that it may be any shape. Cover 55 is securely, yet detachably fastened to top wall member 20 so as to completely cover opening 50 but allow easy removal of the cover 55 when desired. Dimensions and placement of opening 50 on top wall member 20 and construction of cover 55 will be discussed below.

Figure 4:
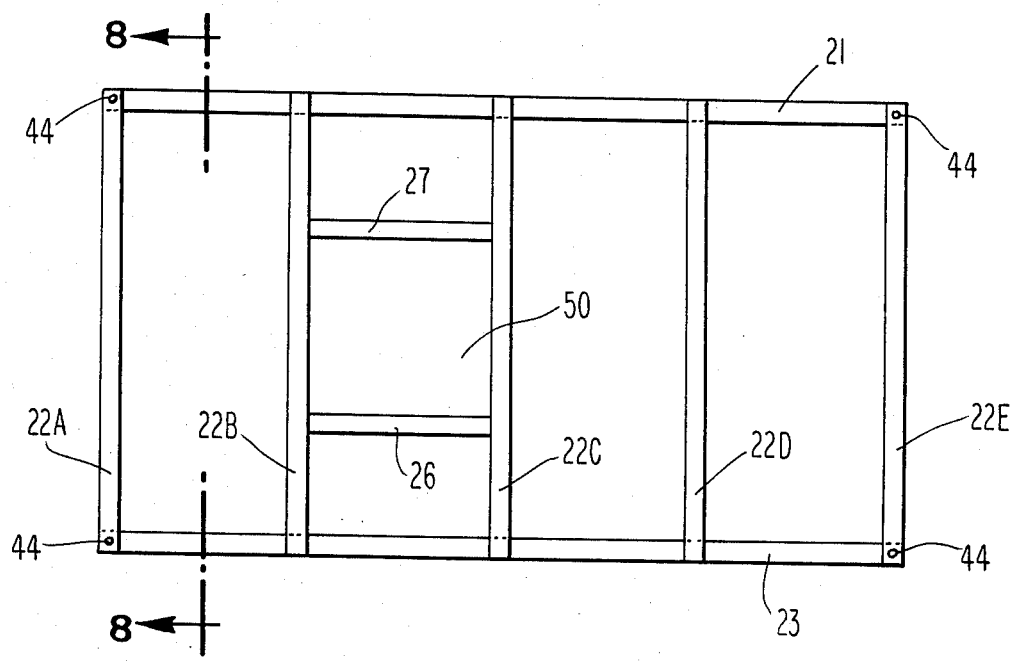
FIG. 4, is a top view of the frame of the top wall member of a cap.
Figure 5:
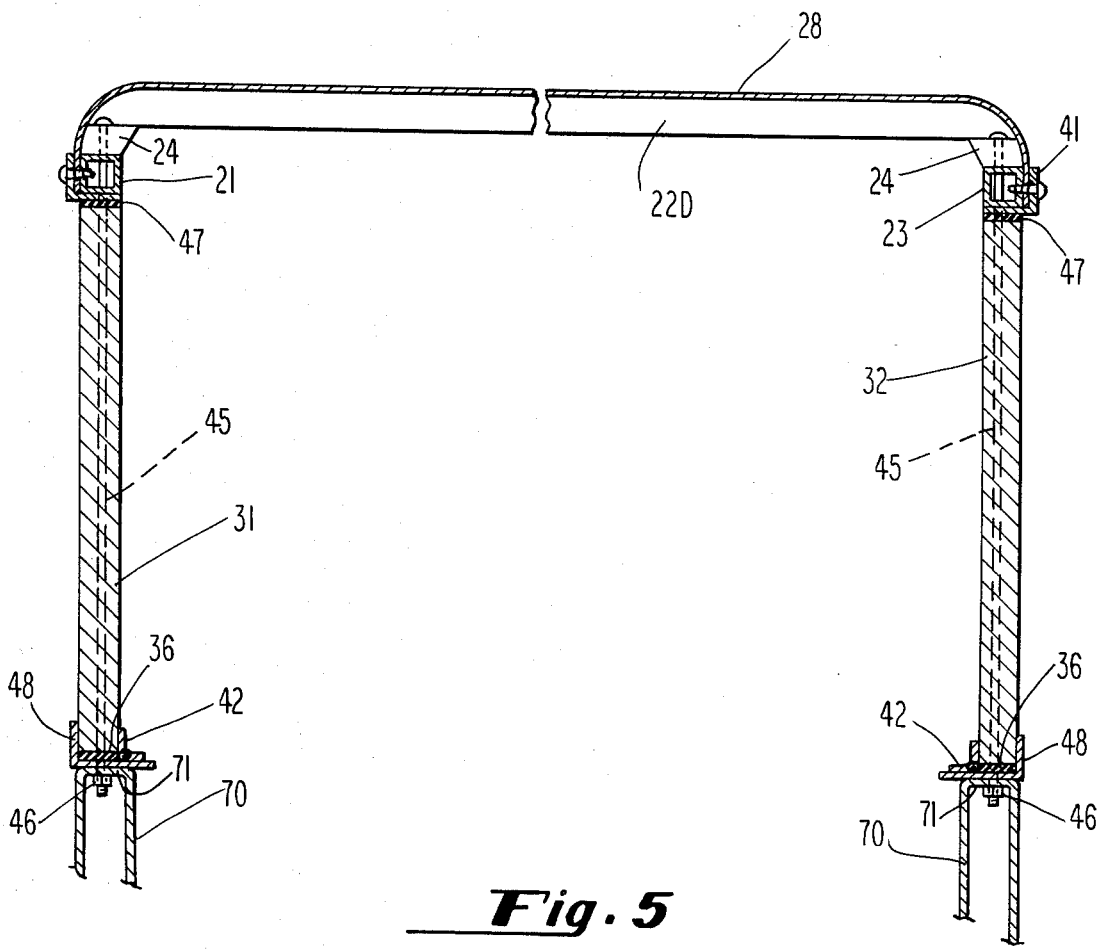
FIG. 5 is a local transverse vertical cross-sectional view taken substantially on the line 5—5 of FIG. 1.
Figure 8:
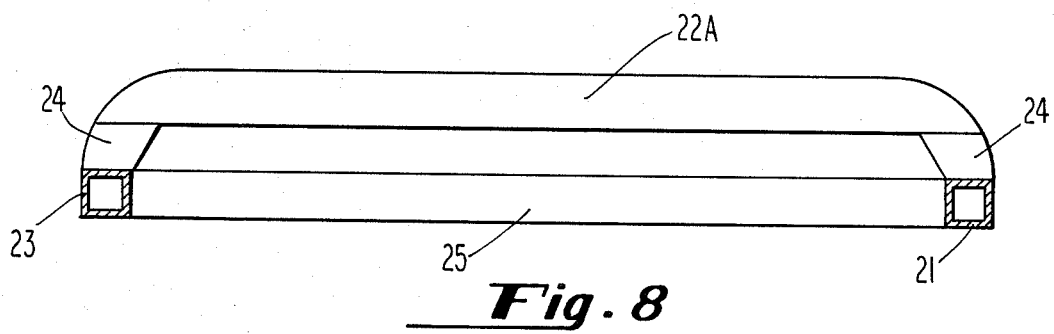
FIG. 8, is a transverse vertical cross-sectioned view taken substantially on the line 8—8 of FIG. 4.

Top wall member 20 comprises a rigid frame as depicted in FIG. 4 covered by a suitable rigid material such as sheet metal, or the like. The frame in FIG. 4 consists of two substantially parallel longitudinal side frame members 21 and 23 of length approximately equal to that of the box of a pick-up truck and a plurality of substantially parallel lateral ribs 22 which are secured to and extend between, but above, the side frame members 21 and 23. Lateral ribs, designated generally as 22, may be secured to side frame members 21 and 23 by fastening each end of each lateral rib 22 to intermediate connecting blocks 24 and fastening each intermediate connecting block 24 to side frame members 21 and 23 as depicted in FIG. 5 and FIG. 8. At each opposing end of the rigid frame of top wall member 20, bottom rails 25 are additionally secured to and extend between the side frame members 21 and 23, as depicted in FIG. 8. The bottom surfaces of bottom rails 25 lie in the same plane as the bottom surfaces of side frame members 21 and 23. Bottom rails 25 extend directly below and substantially parallel to the two outermost lateral ribs 22A and 22E. Bottom rails do not extend below the other lateral ribs 22. The rigid frame of top wall member 20 is suitably dimensioned so as to be receivable on rigid L-shaped members 48, described below, mounted on and along the rims 71 of the truck box 70.

Extending between and secured to two of the lateral ribs 22, by any conventional means, are two rails 26 and 27. The two rails 26 and 27 and the two lateral ribs to which they are attached are spaced and situated within the rigid frame of top wall member 20 so that, when taken together, outline and define opening 50, discussed above. Opening 50 should be large enough and situated on the frame of top wall member 20 so as to allow access to the fifth wheel hitch 100 of the pick-up truck by the king pin 90 of a trailer when top wall member 20 is seated on rims 71 of truck box 70.

The ends of lateral ribs 22 and outer edges of intermediate connecting blocks 24 may be shaped to form a smooth curve as shown in FIGS. 5 and 8. The rigid frame of top wall member 20 is covered with a rigid material such as sheet metal to form skin 28 over the frame. The skin may be attached to the frame by any conventional means. The skin 28 defines an opening 50, described above. Cover 55 consists preferably of the same material as that used for skin 28 in a shape similar to that of opening 50, but may be slightly larger than opening 50. Rigid bars may be securely fastened to the bottom surface of the sheet of skin material, situated so as to fit snugly into opening 50.

Rigid L-shaped brackets 41 are securely fastened to skin 28 and side-frame members 21 and 23 as depicted in FIG. 5. Rigid L-shaped brackets 43 are securely fastened to skin 28 and bottom rails 25 in a similar manner. The bottom surfaces of brackets 41 and 43, taken together, form a continuous horizontal surface that follows the perimeter of top wall member 20 immediately below the bottom surfaces of side-frame members 21 and 23 and bottom rails 25.

Figure 2:
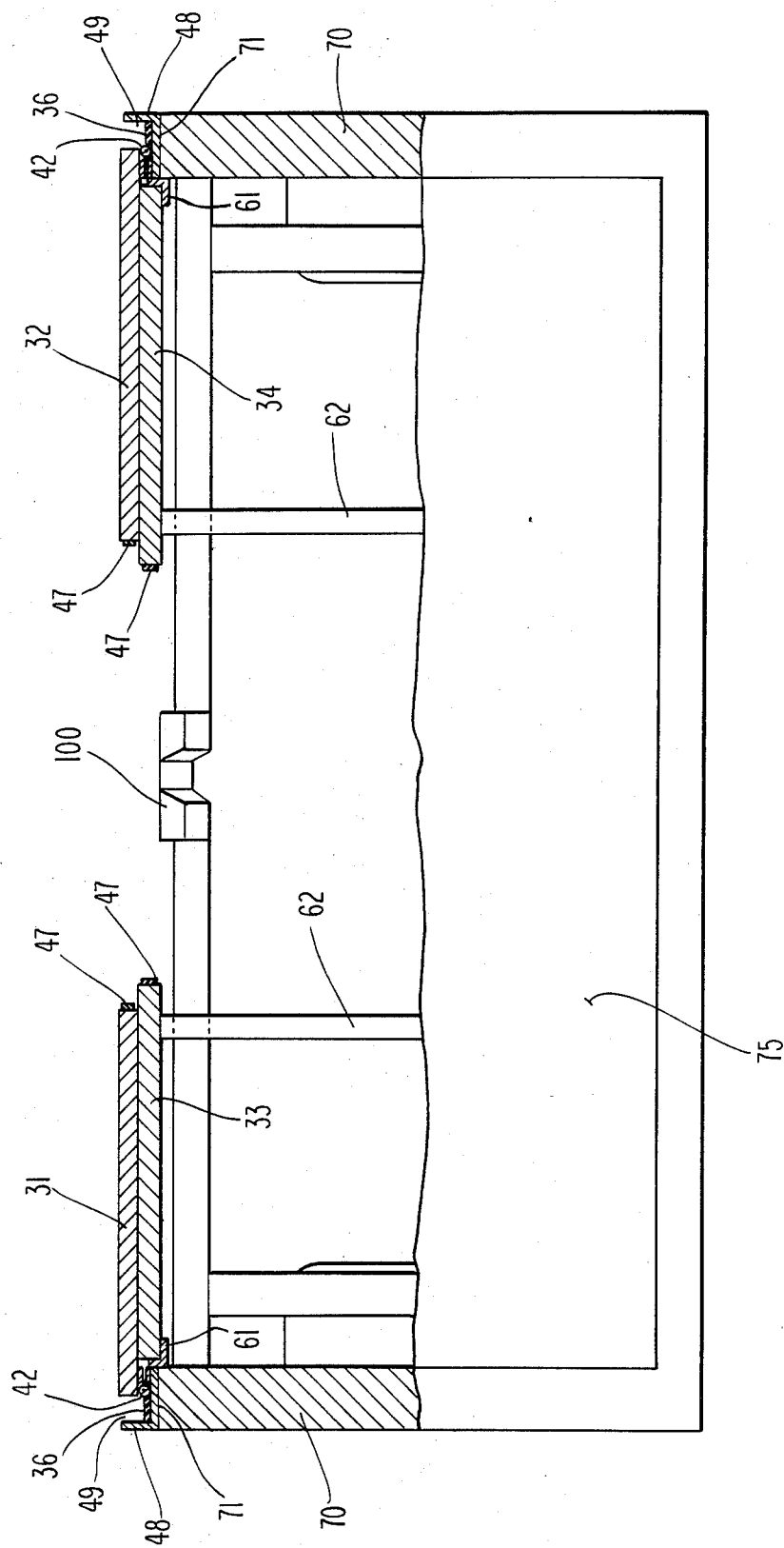
FIG. 2 is a rear view of a pick-up truck with tail gate open and cap in folded compact condition and without top wall member shown in partial section.

Side walls 31 and 32 are spaced apart rigid members securely connected by hinges 42 to L-shaped members 48, which are securely attached to rims 71 of the longitudinal upstanding walls of truck box 70, so that side walls 31 and 32 are foldable downwardly toward truck box 70 as depicted in FIG. 2. The side walls 31 and 32, when folded downwardly to a horizontal position, are receivable immediately above the top surface of rims 71 of truck box 70. See FIG. 2. When unfolded, so that side walls 31 and 32 are upright, the bottom edges of sidewalls 31 and 32 rest on gaskets 36, attached to L-shaped members 48, to form a weather-tight seal.

Figure 7:
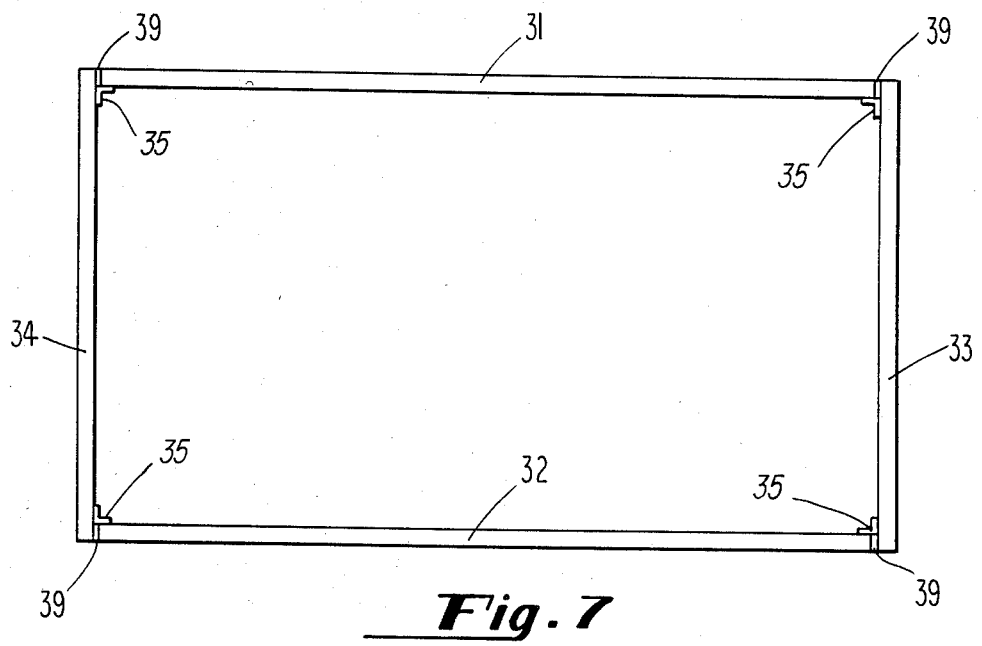
FIG. 7 is top view of an upright front, rear and side wall configuration.

When the cap is expanded to form a rigid weather-resistant camper body as in FIG. 1, front wall 33 and rear wall 34 are detachably secured to the side walls 31 and 32 by L-shaped brackets 35 attached to the inside corners of the configuration formed by the side, front and rear walls as shown in FIG. 7. Gaskets 39 are attached to the vertical edges of side walls 31 and 32 so as to form weather-proof seals between the side walls 31 and 32 and front and rear walls 33 and 34.

Front wall 33, rear wall 34 and side walls 31 and 32 are of substantially the same height, limited by the requirement that when the side walls 31 and 32 are folded downwardly, they must clear the fifth wheel hitch 100. L-shaped brackets 35 extend above the top edges of the sidewalls 31 and 32 and front and rear walls 33 and 34. The lateral width of front wall 33 and rear wall 34 spans substantially the full lateral width of truck box 70. Side walls 31 and 32 are slightly shorter than the length of truck box 70 so as to extend from the rear surface of front wall 33 to the front surface of rear wall 34 such that the outer surfaces of the side walls 31 and 32 are flush with the outer vertical edges of front wall 33 and rear wall 34, as shown in FIG. 7.

Therefore, when top wall member 20 is placed on the upright, expanded configuration of the side, front and rear walls, bottom rails 25 are positioned directly above front wall 33 and rear wall 34, and no point along bottom rails 25 is positioned directly above any point of side walls 31 and 32. Gaskets 47 are attached to the top edges of side walls 31 and 32, front wall 33 and rear wall 34 so as to form a weather-proof seal between the side, front and rear walls and the top wall member. When in the upright, expanded condition, top wall member 20 is securely, yet detachably, attached to the side, front and rear wall configuration by fastening the portions of the L-shaped brackets 35 which extend above the side, front and rear wall configuration securely, yet detachably to the inside corners of the configuration formed by side rails 21 and 23 and bottom rails 25. L-shaped members 48 need not be supplied on the front and rear rims of truck box 70. If L-shaped members 48 are not supplied, gaskets 37 are attached to the bottom edges of front wall 33 and rear wall 34 so that weather-tight seals are formed between the front and rear walls and the front and rear rims of truck box 70. If L-shaped members are supplied on the front and rear rims of truck box 70, gasket 37 may in the alternative be attached to the L-shaped members 48.

Figure 6:
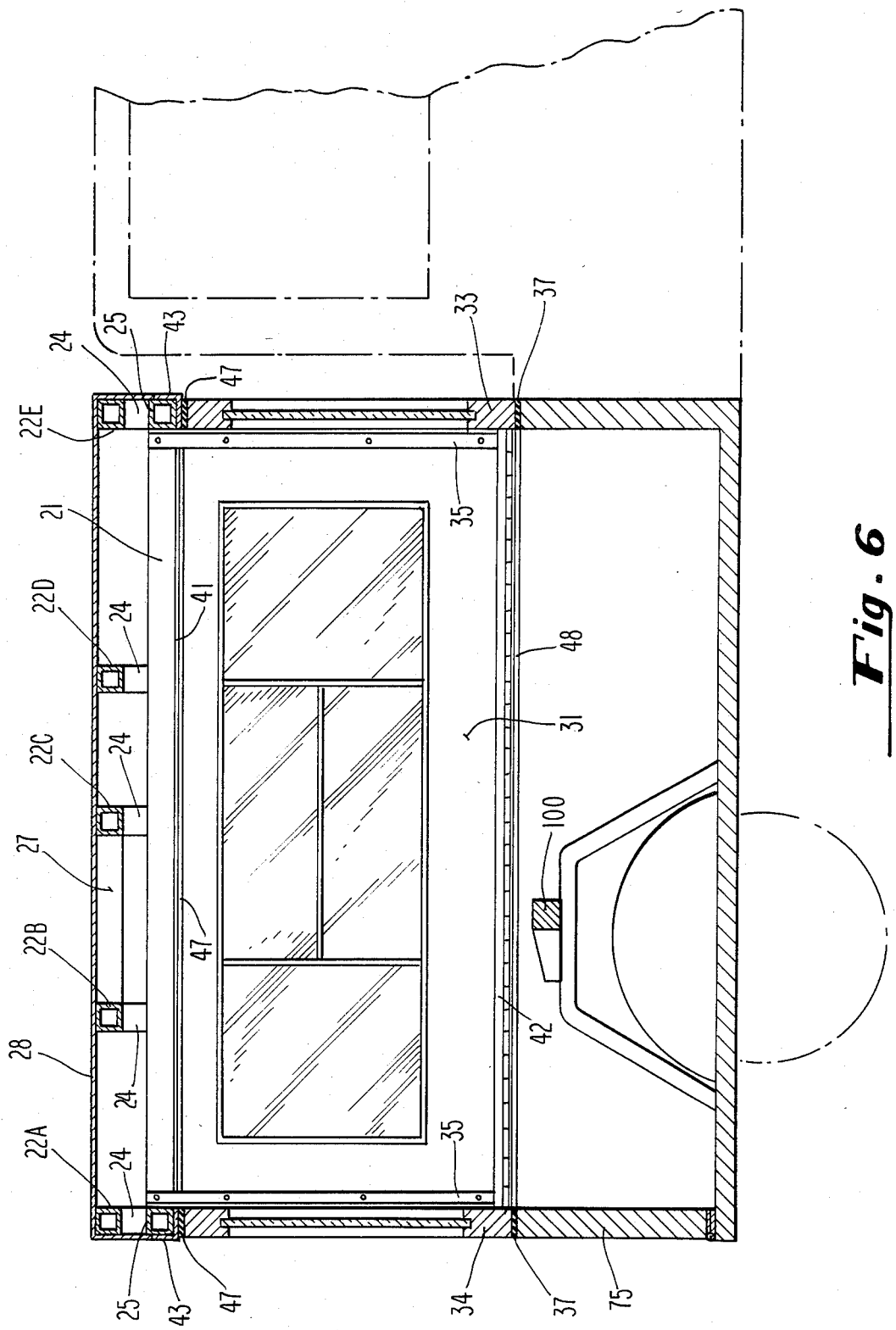
FIG. 6 is a transverse vertical cross-sectional view taken substantially on the line 6—6 of FIG. 1.

As noted earlier, a rigid L-shaped member 48 is securely attached to and extends continuously along the bottom of each of side walls 31 and 32 by means of hinges 42 as depicted in FIG. 2. The rigid L-shaped members 48 are also securely fastened to rims 71 of truck box 70 so as to define U-shaped channels 49 in conjunction with the bottom edges of side wall 31 and 32 when side walls 31 and 32 are folded downwardly. See FIG. 2. Gaskets 36 are attached to the horizontal surface of U-shaped channel 49, as noted above. Side frame members 21 and 23 of top wall member 20 are receivable within the U-shaped channels 49 so that when the compact form of cap attachment 1 is desired, top wall member 20 may be detachably secured to truck box 70 by folding sidewalls 31 and 32 downwardly, storing front and rear walls 33 and 34, and detachably securing side frame members 21 and 23 to L-shaped members 48. Other embodiments allow attachment of the top wall member 20 to truck box 70 by sending a tie rod vertically through each corner of top wall member 20 through the top edge of rim 71 of truck box 70 to a captive nut 46 under the top surface of rim 71 of truck box 70. If this method is employed, top wall member 20 may be attached to the expanded side, front and rear wall configuration by sending a tie rod 45, longer than the tie rods just discussed, vertically through each of the transverse longitudinal ends of front wall 33 and rear wall 34 and through the rim 71 to a captive nut 46 as shown in FIG. 5 and FIG. 6. If this method is employed, L-shaped brackets 35 need not extend above the top edges of side walls 31 and 32, front wall 33 and rear wall 34. FIG. 4 depicts cylindrical holes 44 in the corners of the frame of top wall member 20 which would be present if the tie rod embodiment is employed. The tie rods 45 extend through these cylindrical holes 44 to affix top wall member 20 to the side, front and rear wall configuration or to the truck box as described above.

Although side walls 31 and 32 protrude above the plane defined by the upper surfaces of the rims 71 of truck box 70, the top wall member 20 may rest flush against the gaskets 36 on L-shaped members 48 when such members are employed, and bottom rails 25 rest flush against gaskets on the front and back rims of truck box 70, when front wall 33 and rear wall 34 are removed and side walls 31 and 32 are folded downwardly. This is because the protrusion of side walls 31 and 32 lies wholly within and does not interfere with the lowest points of top wall member 20 described by the bottom horizontal surfaces of L-shaped brackets 41 and 43, which lie immediately below the bottom surfaces of side rails 21 and 23 and bottom rails 25. As explained above, no point of bottom rails 25 lies directly above any point of side walls 31 and 32.

Rear wall 34 is removable and may be stored below the position assumed by side wall 32 when the latter is folded downwardly. Likewise, front wall 33 is removable and may be stored below the position side wall 31 assumes when folded downwardly. Rear wall 34 and front wall 33 may be stored in this position by any of the many obvious support systems. FIG. 2 shows one such system comprising ledges 61 and support arms 62.

Openable windows are positioned on each of the side walls as well as the front and rear walls so that when collapsed in the folded positions with the windows open, the fifth wheel hitch actuating lever is accessible through the open windows from above. Preferably, the windows situated on side walls 31 and 32 slide open.

Figure 9:
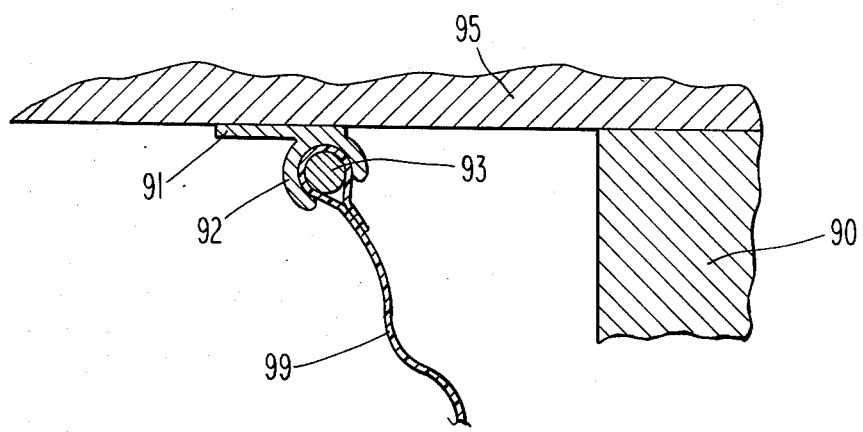
FIG. 9 is a fragmentary side view of a trailer king pin and boot attachment.

When the trailer 95 is to be attached to the pick-up truck, the trailer is connected to the top wall member 20 by means of a flexible boot 99. The boot 99 consists of a waterproof, flexible wide band of material secured to the trailer above and surrounding the king pin 90 by any conventional means. The boot 99 may be permanently affixed to the trailer. One method of fastening the boot to the trailer includes securely attaching to the trailer, about the king pin 90, a frame 91 provided with a rod-retaining channel 92. Within said channel, a rod 93 is slipped through a loop provided along the periphery of the boot material. See FIG. 9.

While one edge of boot 99 is affixed to the trailer as described, the lower edge of boot 99 may be fastened to top wall member 20 about opening 50 in a manner similar to that described for fastening the boot 99 to trailer 95 or by any other conventional method. FIG. 3 shows a rod retaining channel 94, which follows the periphery of opening 50 in top wall member 20, to which the boot 99 may be attached. The boot 99 should be detachably fastened to top wall member 20. When the trailer 95 is not to be attached to the pick-up truck, the boot 99 may hang freely from the trailer 95, may be folded or rolled up and stored on the trailer above the king pin 90, or may be removed from the trailer.

To attach trailer 95 to the pick-up truck, top wall member 20 is removed from the pick-up truck, cover 55 is removed, and top wall member 20 is attached to the trailer by means of the boot 99. Top wall member 20 is then hung from the trailer by slings or other similar means while the pick-up truck, with the remaining parts of the cap in compact, folded condition and with trailer hitch 100 locked open, is backed under the suspended top wall member 20. The safety and breakaway cables may then be attached by inserting an arm through the open windows of side wall 31 and front panel 33. The top is then lowered into place and secured to the rims 71 of truck box 70 as described above. Of course, top wall member 20 may alternatively be attached first to truck box 70 and then trailer 95 attached. In that case, the tail gate of the pick-up truck must be opened and one must slip inside the covered truck box to secure the hitch. In an alternative embodiment, easy access to the hitch, when top wall member 20 is first attached to truck box 70, may be achieved by including a removable section 561 as shown in FIG. 31 on top wall member 20 which extends from opening 50 to the rear edge of top wall member 20.

Note that top wall member 20 may be employed alone, without side, front and rear walls, as a weather-tight cover for pulling a fifth wheel trailer.

Whether the cap 1 is in the expanded camper mode or the compact, folded mode, tail gate 75 of the pick-up truck is openable in the usual method so that the inside of the truck box is accessible.

When the cap 1 is in the compact, folded mode, cover 55 may be left attached, forming a substantially weather-resistant compact cover for the truck box. In another embodiment, top wall member 20 may be made without opening 50 and cover 55. This creates a solid, rigid cover for truck box 70.

I claim:

1. In combination with a truck having a box defined by upstanding walls and a fifth wheel means positioned in said box, a rigid, foldable, substantially weather-resistant camper body comprising:
    a rectangular rigid, water-resistant top wall member said top wall member having an opening therein above said fifth wheel means so that the king pin of a trailer means may extend downwardly to said fifth wheel means;
    a cover selectively detachably secured to said top wall member so as to close said opening at times;
    rigid longitudinal side wall members having top and bottom horizontal edges and front and rear vertical edges, said side wall member being hinged along the bottom horizontal edges of said side wall members to the longitudinal upstanding walls of said box, so that said side wall members are foldable downwardly toward said box;
    a rigid front wall member being selectively detachably securable to the forward vertical edges of said side wall members;
    a rigid rear wall member being selectively detachably securable to the rear vertical edges of said side wall members;
    said top wall member being selectively detachably securable to said side wall members and said front and rear wall members;
    said front wall member and said rear wall member being receivable within said box;
    said top wall member being selectively detachably securable to the longitudinal edges of said box when said side wall members are folded' downwardly and said front wall member and said rear wall member are situated within said box;
    whereby said top wall member, with front, rear and side walls in folded condition and said top wall member secured to said box, forms,a weather-resistant cover for said box.

2. The combination as in claim 1, wherein said front wall member is selectively detachably securable to the forward vertical edges of said side wall members and said rear wall member is selectively detachably securable to the rear vertical edges of said side wall members by means of L-shaped brackets which extend above the top horizontal edges of said side wall members and said front wall member and said rear wall member, said L-shaped brackets being additionally selectively detachably securable to said top wall member.

3. The combination as in claim 1, wherein said top wall member is selectively detachably securable to said side wall members and said front and rear wall members by means of tie rods extending downwardly through said top wall member, through said front, and rear wall members to captive nuts immediately below the rims of said truck box, and said top wall member is selectively detachably securable to the longitudinal edges of said box, when said side wall member are folded downwardly and said front wall member and said rear wall member are situated within said box, by means of a second set of tie rods extending downwardly through said top wall member to said captive nuts.

4. The combination as in claim 1, wherein said top wall member is selectively detachably securable to said side wall members by means of tie rods extending downwardly through said top wall member, through said side wall members, to captive nuts immediately below the rims of said truck box, and said top wall member is selectively detachably securable to the longitudianl edges of said box, when said side wall members are folded downwardly and said front wall member and said rear wall member are situated within said box, by means of a second set of tie rods extending downwardly through said top wall member to said captive nuts.

5. The combination as in claim 1 or 2, further comprising gaskets forming substantially weather-proof seals at all seams.

6. The combination as in claims 1 or 2, which additionally comprises a removable section extending from said cover to the rear of said top wall member, allowing access to said fifth wheel means when said top wall member is secured to said truck box.

7. In combination with a truck having a box defined by upstanding walls and a fifth wheel means positioned in said box, a rigid, foldable, substantially weather-resistant camper body comprising:

a rectangular, rigid, weather-resistant top wall member, rigid longitudinal side wall members having top and bottom horizontal edges and front and rear vertical edges, said side wall member being hinged along the bottom, horizontal edges of said side wall members to the longitudinal upstanding walls of said box, so that said side wall members are foldable downwardly toward said box, a rigid front wall member being selectively detachably securable to the forward vertical edges of said side wall members, a rigid rear wall member being selectively detachably securable to the rear vertical edges of said side wall members;

said top wall member being selectively detachably securable to said side wall members and said front and rear wall members;

said front wall member and said rear wall member being receivable within said box;

said top wall member being selectively detachably securable to the longitudinal edges of said box when said side wall members are folded downwardly and said front wall member and said rear wall member are situated within said box;

whereby said top wall member, when attached to said truck box with front, rear and side wall members in folded condition, forms a rigid, low, weather-resistant cover for said truck box.

* * * * *

UNITED STATES PATENT OFFICE
CERTIFICATE OF CORRECTION

Patent No. 4,542,911　　　　　　Dated September 24, 1985

Inventor(s) Robert J. Mulligan

It is certified that error appears in the above-identified patent and that said Letters Patent are hereby corrected as shown below:

35 USC 254:

Column 6, line 2:

"561 as shown in FIG. 31" should be --56 (as shown in FIG. 3)--

Column 6, line 55:

after "box,", "forms,a" should be --forms a--

Column 7, line 7:

after "wall", "member" should be --members--

Column 7, lines 18 and 19:

after "the", "longitudianl" should be --longitudinal--

Signed and Sealed this

Twenty-first Day of January 1986

[SEAL]

*Attest:*

DONALD J. QUIGG

*Attesting Officer*　　*Commissioner of Patents and Trademarks*